(12) United States Patent
Shah et al.

(10) Patent No.: US 12,476,907 B2
(45) Date of Patent: Nov. 18, 2025

(54) BGP LU RESILIENCY USING AN ANYCAST SID AND BGP DRIVEN ANYCAST PATH SELECTION

(71) Applicant: Ciena Corporation, Hanover, MD (US)

(72) Inventors: Himanshu Shah, Hopkinton, MA (US); Atul Vadera, Gurugram (IN); Jayant Kumar Bhardwaj, Gurugram (IN); Piyush Sharma, Gurugram (IN)

(73) Assignee: Ciena Corporation, Hanover, MD (US)

( * ) Notice: Subject to any disclaimer, the term of this patent is extended or adjusted under 35 U.S.C. 154(b) by 234 days.

(21) Appl. No.: 18/084,106

(22) Filed: Dec. 19, 2022

(65) Prior Publication Data

US 2023/0120019 A1  Apr. 20, 2023

Related U.S. Application Data

(63) Continuation of application No. 17/366,271, filed on Jul. 2, 2021, now Pat. No. 11,563,675.

(30) Foreign Application Priority Data

May 14, 2021 (IN) .............................. 202111021859

(51) Int. Cl.
| | |
|---|---|
| H04W 74/08 | (2024.01) |
| H04L 12/46 | (2006.01) |
| H04L 45/00 | (2022.01) |
| H04L 45/50 | (2022.01) |
| H04W 72/04 | (2023.01) |
| H04W 76/14 | (2018.01) |

(52) U.S. Cl.
CPC ........ *H04L 45/507* (2013.01); *H04L 12/4641* (2013.01); *H04L 45/66* (2013.01)

(58) Field of Classification Search
CPC ... H04L 45/507; H04L 12/4641; H04L 45/66; H04L 12/4633
See application file for complete search history.

(56) References Cited

U.S. PATENT DOCUMENTS

| | | | |
|---|---|---|---|
| 6,330,614 | B1 | 12/2001 | Aggarwal et al. |
| 7,386,605 | B2 | 6/2008 | Shah |
| 7,430,176 | B2 | 9/2008 | Nalawade et al. |
| 7,506,194 | B2 | 3/2009 | Appanna et al. |
| 7,532,631 | B2 | 5/2009 | Raszuk et al. |

(Continued)

*Primary Examiner* — Luat Phung
(74) *Attorney, Agent, or Firm* — Baratta Law PLLC; Lawrence A. Baratta, Jr.

(57) ABSTRACT

A node, in a first network, includes circuitry configured to determine a next hop as decided by Border Gateway Protocol (BGP) is an anycast prefix to a Route Reflector (RR) interconnecting the first network with a second network, responsive to the next hop being the anycast prefix to the RR, create a tunnel with a destination based on the anycast prefix, and utilize the tunnel for traffic having the next hop as the anycast prefix to the RR. The anycast prefix is assigned to two or more RRs interconnecting the first network and the second network. A first path is decided by BGP based on a BGP Path Selection Algorithm that is independent of a second path determined by Interior Gateway Protocol (IGP). The first path and the second path can be different, and wherein tunnel is utilized to ensure the traffic always follows the first path.

17 Claims, 9 Drawing Sheets

(56) References Cited

U.S. PATENT DOCUMENTS

| | | | |
|---|---|---|---|
| 7,924,830 B2 * | 4/2011 | Satterlee | H04L 41/0668 |
| | | | 370/392 |
| 8,259,590 B2 | 9/2012 | Shah et al. | |
| 8,295,278 B2 | 10/2012 | Shah et al. | |
| 8,560,708 B2 | 10/2013 | Nelakonda et al. | |
| 9,237,090 B2 | 1/2016 | Tripathi et al. | |
| 9,509,593 B2 | 11/2016 | Sharma et al. | |
| 9,538,573 B2 | 1/2017 | Khan et al. | |
| 10,158,448 B2 | 12/2018 | Prakash et al. | |
| 10,158,500 B2 | 12/2018 | Chhabra et al. | |
| 10,728,087 B2 | 7/2020 | Agarwal et al. | |
| 10,862,743 B2 | 12/2020 | Bhardwaj et al. | |
| 10,862,797 B2 | 12/2020 | Gautam et al. | |
| 10,887,225 B1 * | 1/2021 | Chan | H04L 12/4633 |
| 11,277,328 B1 * | 3/2022 | Sharma | H04L 45/04 |
| 2012/0069745 A1 * | 3/2012 | Kini | H04L 45/28 |
| | | | 370/395.5 |
| 2019/0132241 A1 * | 5/2019 | Vattem | H04L 12/4633 |
| 2019/0379596 A1 | 12/2019 | Sharma et al. | |
| 2020/0127913 A1 * | 4/2020 | Filsfils | H04L 45/741 |
| 2020/0177500 A1 | 6/2020 | Agarwal et al. | |
| 2020/0358681 A1 | 11/2020 | Shah et al. | |
| 2021/0092043 A1 * | 3/2021 | Filsfils | H04L 45/586 |
| 2021/0111991 A1 | 4/2021 | Vadera | |
| 2022/0303212 A1 * | 9/2022 | Chan | H04L 45/04 |

* cited by examiner

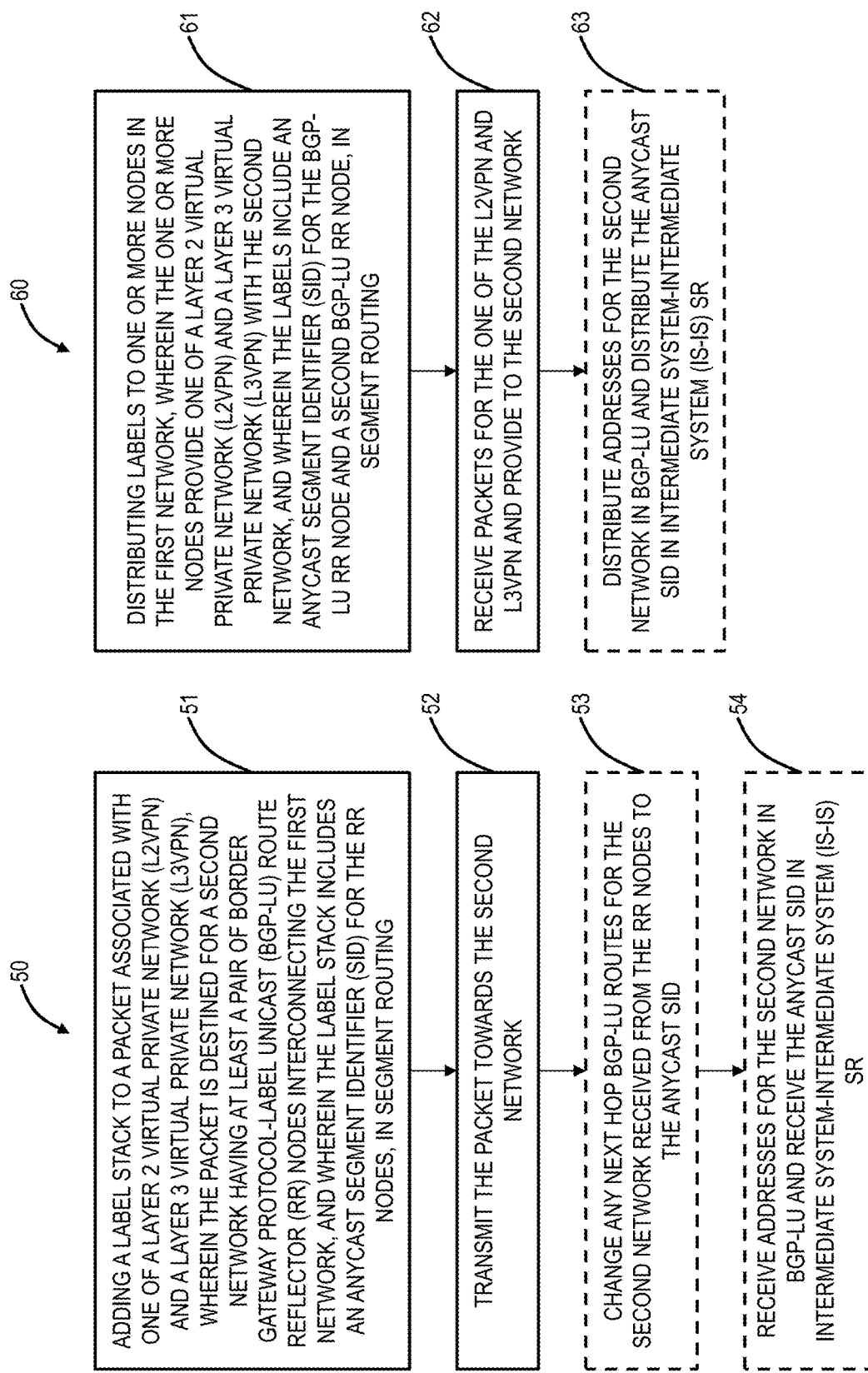

BGP LU RESILIENCY USING AN ANYCAST SID AND BGP DRIVEN ANYCAST PATH SELECTION

CROSS-REFERENCE TO RELATED APPLICATION(S)

The present disclosure is a continuation of U.S. patent application Ser. No. 17/366,271, filed Jul. 2, 2021, which claimed priority to Indian Patent Application No. 202111021859, filed May 14, 2021, the contents of each are incorporated by reference in their entirety.

FIELD OF THE DISCLOSURE

The present disclosure generally relates to networking. More particularly, the present disclosure relates to systems and methods for Border Gateway Protocol (BGP) Label Unicast (LU) resiliency using an anycast Segment Identifier (SID) and BGP driven anycast path selection.

BACKGROUND OF THE DISCLOSURE

BGP LU Prefix Independent Convergence (PIC) is a solution which can be used for BGP LU redundancy. This is used along with Multi Hop (MHOP) Internet Protocol (IP) Bi-directional Fault Detection (BFD) between BGP Peers. Disadvantageously, the BGP LU PIC solution requires specialized hierarchical implementation in hardware. In fact, many of chipsets (hardware) do not have such flexibility and support to achieve proper BGP LU PIC functionality. Also, the implementation of BGP LU PIC reduces overall scale in hardware for supporting Label Switched Paths (LSPs). The BGP LU PIC protection works along with MHOP IP BFD and is triggered after MHOP IP BFD detects failure, which is around ~300 ms or more. Without using MHOP IP BFD, the BGP LU PIC protection depends on BGP timers and takes seconds to achieve protection of traffic.

BRIEF SUMMARY OF THE DISCLOSURE

The present disclosure relates to systems and methods for Border Gateway Protocol (BGP) Label Unicast (LU) resiliency using an Anycast Segment Identifier (SID) and BGP driven anycast path selection. Segment Routing (SR) is emerging as a widely accepted tunneling (underlay) approach. The present disclosure leverages SR approaches to optimize the resiliency in hierarchical networks and to overcome the aforementioned limitations of BGP LU PIC protection.

In an embodiment, a node, in a first network, includes circuitry configured to add a label stack to a packet associated with one of a Layer 2 Virtual Private Network (L2VPN) and a Layer 3 Virtual Private Network (L3VPN), wherein the packet is destined for a second network having at least a pair of Border Gateway Protocol-Label Unicast (BGP-LU) Route Reflector (RR) nodes interconnecting the first network, and wherein the label stack includes an anycast Segment Identifier (SID) for the RR nodes, in Segment Routing, and transmit the packet towards the second network.

The label stack can also include a BGP-LU label for a destination in the second network. Responsive to isolation of one of the RR nodes, a Point of Local Repair (PLR) node in the first network can be configured to implement Topology-Independent Loop-Free Alternate (TI-LFA) for the anycast SID. Responsive to isolation of one of the RR nodes, the packet can be redirected by a Point of Local Repair (PLR) node in the first network, prior to the node determining the isolation.

The circuitry can be further configured to change any Next Hop BGP-LU routes for the second network received from the RR nodes to the anycast SID. The circuitry can be further configured to receive addresses for the second network in BGP-LU and receive the anycast SID in Intermediate System-Intermediate System (IS-IS) SR. The label stack can also include a service label for the one of the L2VPN and L3VPN. The anycast SID is used in lieu of BGP LU Prefix Independent Convergence (PIC). The circuitry can be further configured to determine next hop is an anycast prefix and configure a tunnel path to a destination of the anycast prefix.

In another embodiment, a Border Gateway Protocol-Label Unicast (BGP-LU) Route Reflector (RR) node interconnects a first network and a second network. The node includes circuitry configured to distribute labels to one or more nodes in the first network, wherein the one or more nodes provide one of a Layer 2 Virtual Private Network (L2VPN) and a Layer 3 Virtual Private Network (L3VPN) with the second network, and wherein the labels include an anycast Segment Identifier (SID) for the BGP-LU RR node and a second BGP-LU RR node, in Segment Routing, and receive packets for the one of the L2VPN and L3VPN and provide to the second network.

The labels can also include a BGP-LU label for a destination in the second network. Responsive to isolation of the BGP-LU RR node, a Point of Local Repair (PLR) node in the first network can be configured to implement Topology-Independent Loop-Free Alternate (TI-LFA) for the anycast SID. Responsive to isolation of the BGP-LU RR node, the packets can be redirected by a Point of Local Repair (PLR) node in the first network. The circuitry can be further configured to distribute addresses for the second network in BGP-LU and distribute the anycast SID in Intermediate System-Intermediate System (IS-IS) SR. The anycast SID is used in lieu of BGP LU Prefix Independent Convergence (PIC).

In a further embodiment, a method includes, at a node, in a first network, adding a label stack to a packet associated with one of a Layer 2 Virtual Private Network (L2VPN) and a Layer 3 Virtual Private Network (L3VPN), wherein the packet is destined for a second network having at least a pair of Border Gateway Protocol-Label Unicast (BGP-LU) Route Reflector (RR) nodes interconnecting the first network, and wherein the label stack includes an anycast Segment Identifier (SID) for the RR nodes, in Segment Routing; and transmitting the packet towards the second network.

The label stack can also include a BGP-LU label for a destination in the second network. Responsive to isolation of one of the RR nodes, a Point of Local Repair (PLR) node in the first network can be configured to implement Topology-Independent Loop-Free Alternate (TI-LFA) for the anycast SID. Responsive to isolation of one of the RR nodes, the packet can be redirected by a Point of Local Repair (PLR) node in the first network, prior to the node determining the isolation. The method can further include changing any Next Hop BGP-LU routes for the second network received from the RR nodes to the anycast SID.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 7 is a flowchart of a process, implemented at a node, in a first network, for BGP-LU resiliency using an anycast SID.

FIG. 8 is a flowchart of a process, implemented at BGP-LU RR node interconnecting a first network and a second network, for BGP-LU resiliency using an anycast SID.

DETAILED DESCRIPTION OF THE DISCLOSURE

Figure 1:
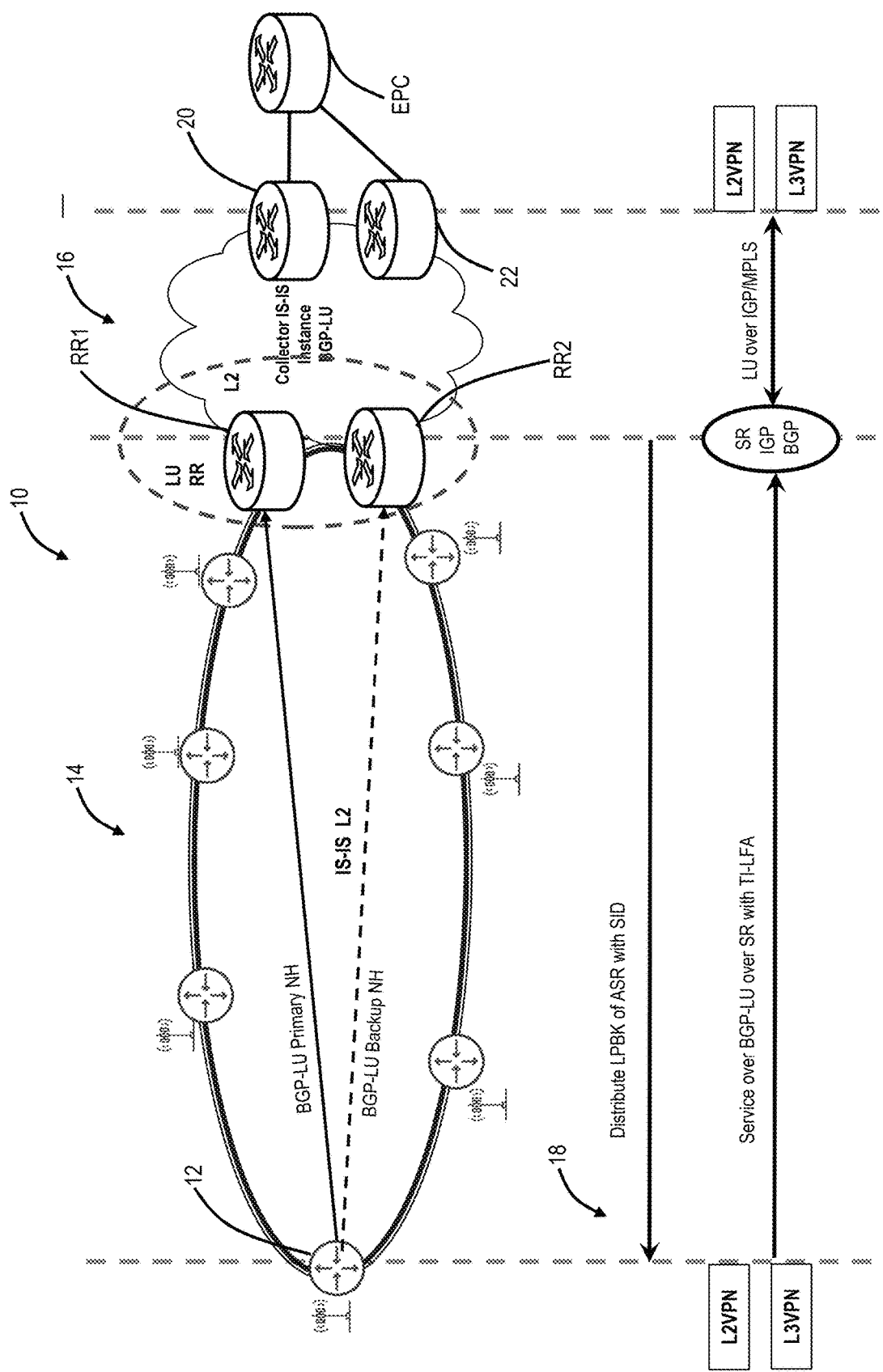
FIG. 1 is a network diagram of a network illustrating a typical deployment of Border Gateway Protocol—Label Unicast (BGP-LU).

Again, the present disclosure relates to systems and methods for Border Gateway Protocol (BGP) Label Unicast (LU) resiliency using an Anycast Segment Identifier (SID) and BGP driven anycast path selection. Segment Routing (SR) is emerging as a widely accepted tunneling (underlay) approach. The present disclosure leverages SR approaches to optimize the resiliency in hierarchical networks and to overcome the aforementioned limitations of BGP LU PIC protection.

Segment Routing Overview

In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and Multiprotocol Label Switching (MPLS) (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments that are instructions a node executes on an incoming packet. For example, segments can include forward the packet according to the shortest path to the destination, forward through a specific interface, or deliver the packet to a given application/service instance). Each Segment is represented by a Segment Identifier (SID).

In SR-MPLS, all SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SR-MPLS, SRGB is a local property of a node and identifies the set of local labels reserved for global segments. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types, namely an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by ISIS or OSPF. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by an adjacency SID, which represents a specific adjacency, such as egress interface, to a neighboring router. The adjacency SID is distributed by ISIS or OSPF. The adjacency segment steers the traffic to a specific adjacency.

An anycast segment is a type of prefix segment that represents an anycast group. An anycast segment/SID is used for policies or protection. When forwarding traffic to an anycast SID, a node processing the forwarding will pick a device from the anycast group, which is the closest. If the closest device from the anycast group goes away, traffic will automatically switch to the next closest device in the anycast group.

SR-MPLS utilizes MPLS labels for the SID, whereas SRv6 utilizes an IPv6 address for a SID, i.e., when an SRv6 SID is in the Destination Address field of an IPv6 header of a packet, it is routed through an IPv6 network as an IPv6 address. Note, various example embodiments described herein are presented with reference to SR-MPLS, but those skilled in the art will recognize SRv6 is also contemplated.

A multicast SID represents a multicast segment that denotes the replication of the received packet. The implied interpretation of the Ethernet frame with multicast SID is that the received frame is of type BUM.

A service SID represents an Ethernet Virtual Private Network (EVPN) service instance. It is an absolute MPLS label value that uniquely identifies an EVPN instance and is configured on all the PEs that are a member of that EVPN instance.

A broadcast service SID identifies the received packet on the service as BUM. It is an absolute MPLS label value and is configured on all the PEs that are a member of that EVPN instance.

A broadcast node SID is advertised by a node that identifies the BUM Ethernet payload. The broadcast node SID is common for all the EVPN instances configured on that node. All the SR nodes identify and process this SID, the same as node SID. The broadcast node SID is interchangeably referred to as "destination SID for BUM" or as "broadcast SID" in this document.
BGP-LU Prefix Independent Convergence (PIC) Example A typical LxVPN (Layer×Virtual Private Network, where x can be 2, 3, etc.) service provider network spans across multiple access, aggregation, and core networks. To simplify and scale large networks, BGP is used to segregate the Interior Gateway Protocol (IGP) domains and exchange the routing information across the IGP domains to provide end to end connectivity. In addition, BGP LU is used to facilitate MPLS based tunnel/transport between network segments/domains/region. Within each region, the BGP LU is carried over some underlying IGP MPLS based tunneling technology such as SR.

FIG. 1 is a network diagram of a network 10 illustrating a typical deployment of BGP-LU. In FIG. 1, nodes 12 on an access ring in an access network 14 are edge nodes that are subtended by access ring headend nodes, labeled as RR1 and RR2. The nodes RR1, RR2 are BGP-LU route reflector that peers with all the access nodes 12 as route reflector clients. Each node 12 peers with the nodes RR1, RR2 to avoid a single point of failure. Each RR provides a MPLS labeled path to the destinations outside of the access network 14. As inline RRs, all the off-ring traffic exits through them to a core network 16 using the labelled path advertised by them to each of its client, the nodes 12. LxVPN services 18 on the access nodes 12 use BGP LU over SR up to inline RRs which in turn provides path across domains to reach the core network 16. The nodes RR1, RR2 are route reflector and provide BGP LU Label Switch Router (LSR) functionality.

In order to avoid a single point of failure, the pair of BGP-LU nodes RR1, RR2 at the domain boundaries are placed which works in tandem to provide connectivity between the regions, the access network 14 and the core network 16. In the event of a failure of a BGP-LU node, the members in the region quickly switch over to the alternate BGP-LU node for across the region reachability. The BGP Prefix-Independent-Convergence (BGP-PIC) scheme is used for such purposes. The issue with BGP-PIC is the longer fail-over time. This is the result of requiring longer fault monitoring intervals in order to accommodate the IGP based resiliency before triggering fault for the BGP. This translates to longer duration of service outage for the entire region the failed BGP-LU node is subtending. In today's ever increasing high bandwidth network, such service outage translates to a large amount of revenue generating and sometimes very critical service data. Therefore, it is extremely advantageous to offer a solution to reduce such service outage that leapfrogs the competition.
Anycast SID The present disclosure uses the Anycast feature of SR to provide a unique approach which simplifies the end-to-end BGP LU tunnel resiliency and improves on the duration of the traffic outages.

Figure 2:
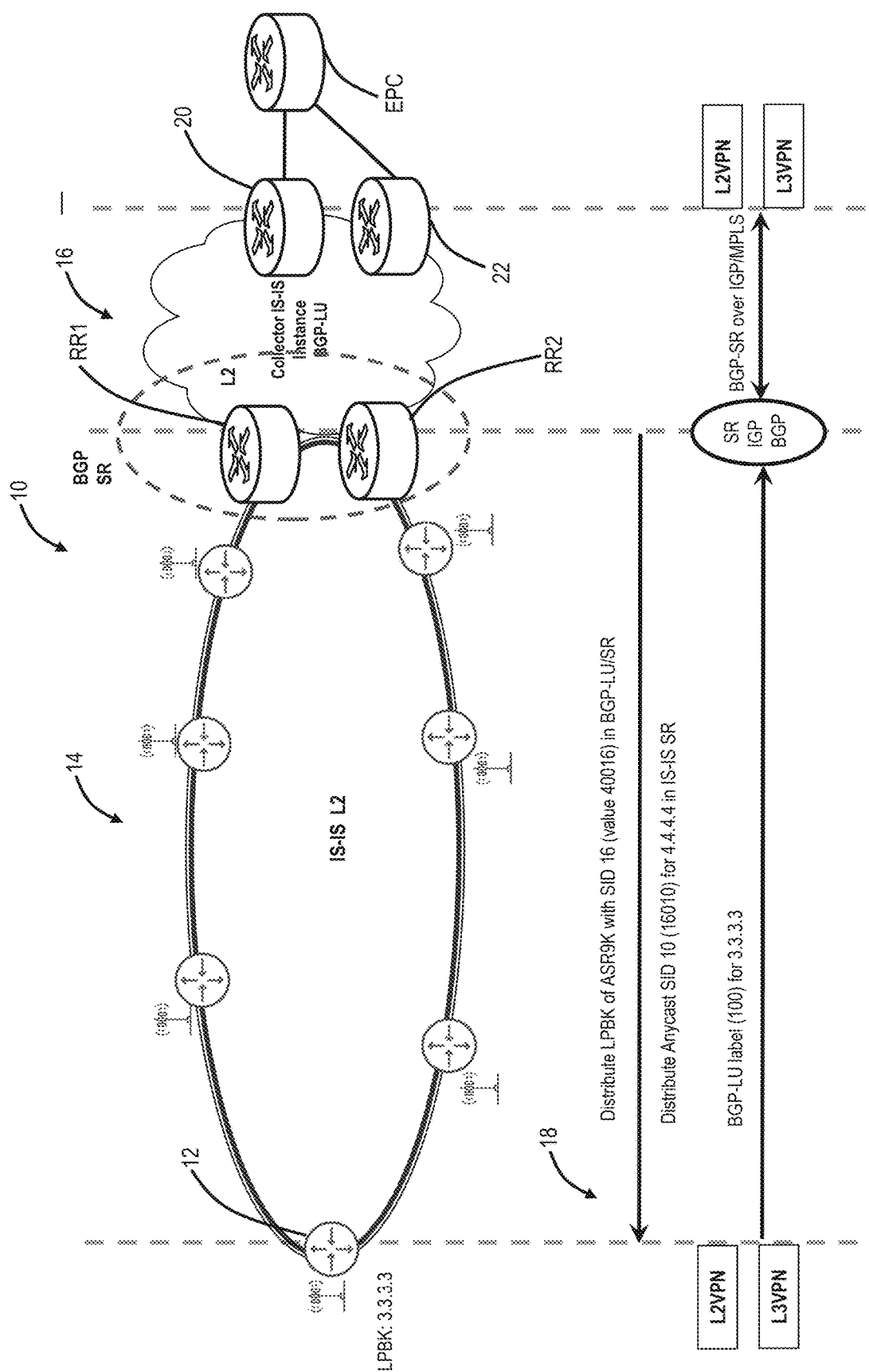
FIG. 2 is a network diagram of the network illustrating the anycast feature of Segment Routing for the end-to-end BGP LU tunnel resiliency.
Figure 3:
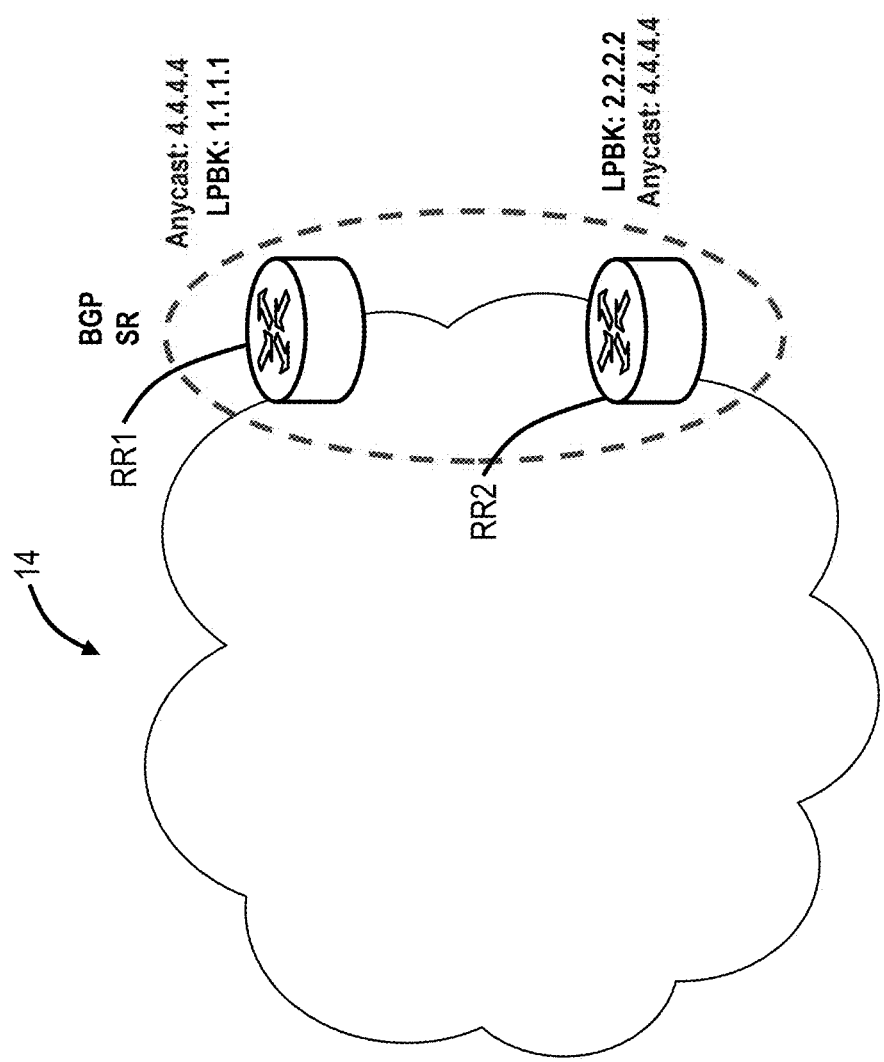
FIG. 3 is a diagram of the nodes RR1, RR2 and their corresponding addresses.
Figure 4:
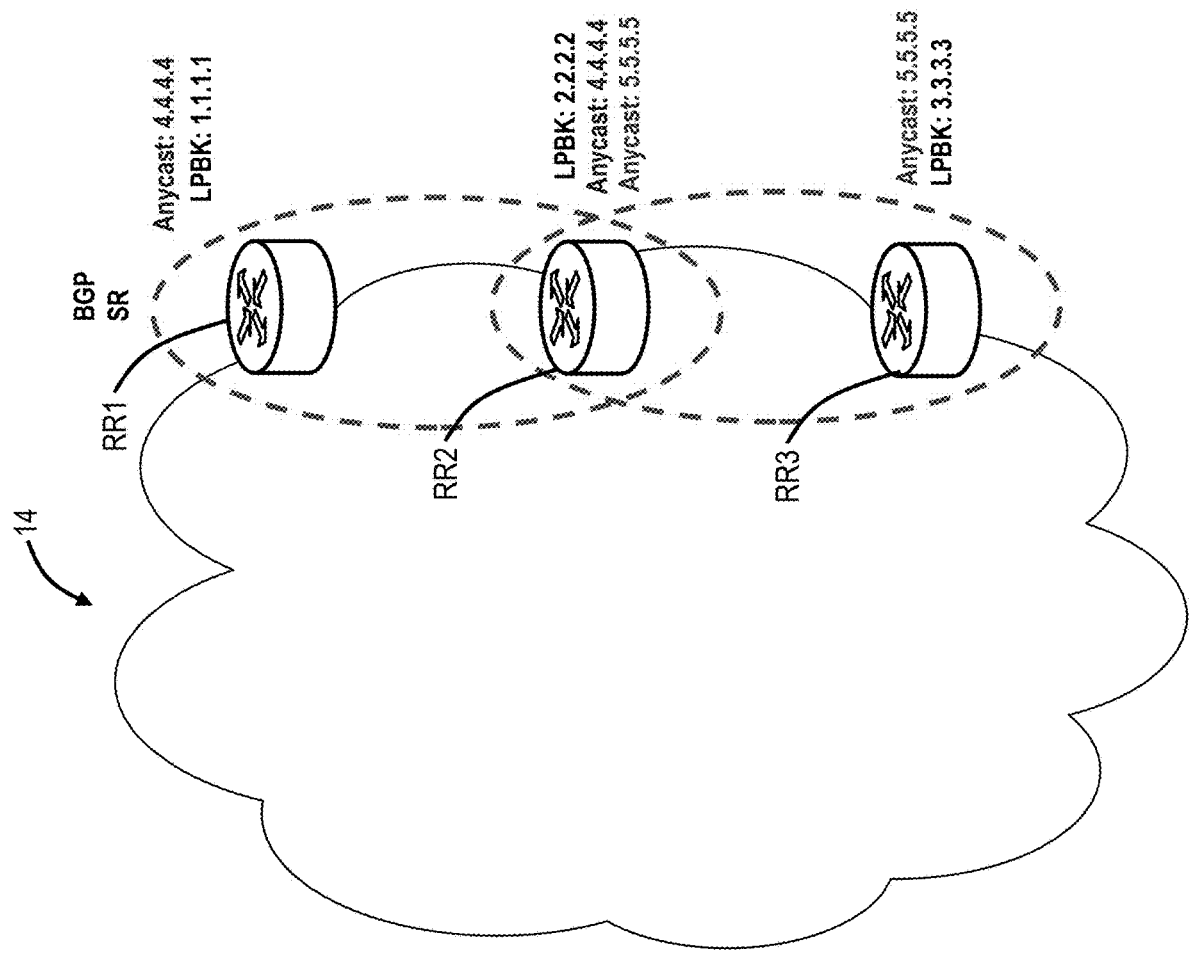
FIG. 4 is a diagram of the nodes RR1, RR2, RR3 and their corresponding addresses illustrating multiple anycast groups.
Figure 5:
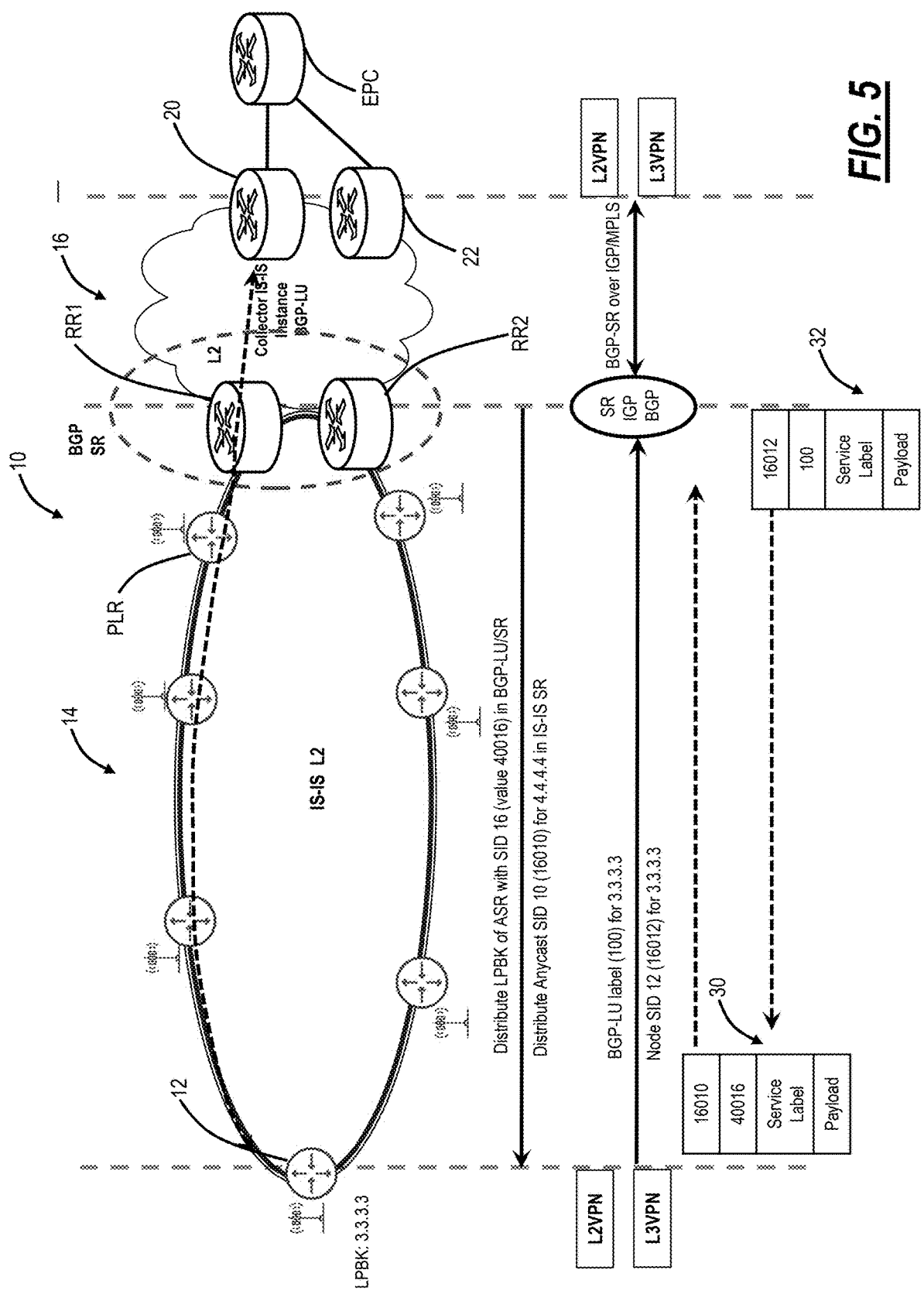
FIG. 5 is a network diagram of the network with the anycast feature illustrating data traffic flow and a SR label stack.
Figure 6:
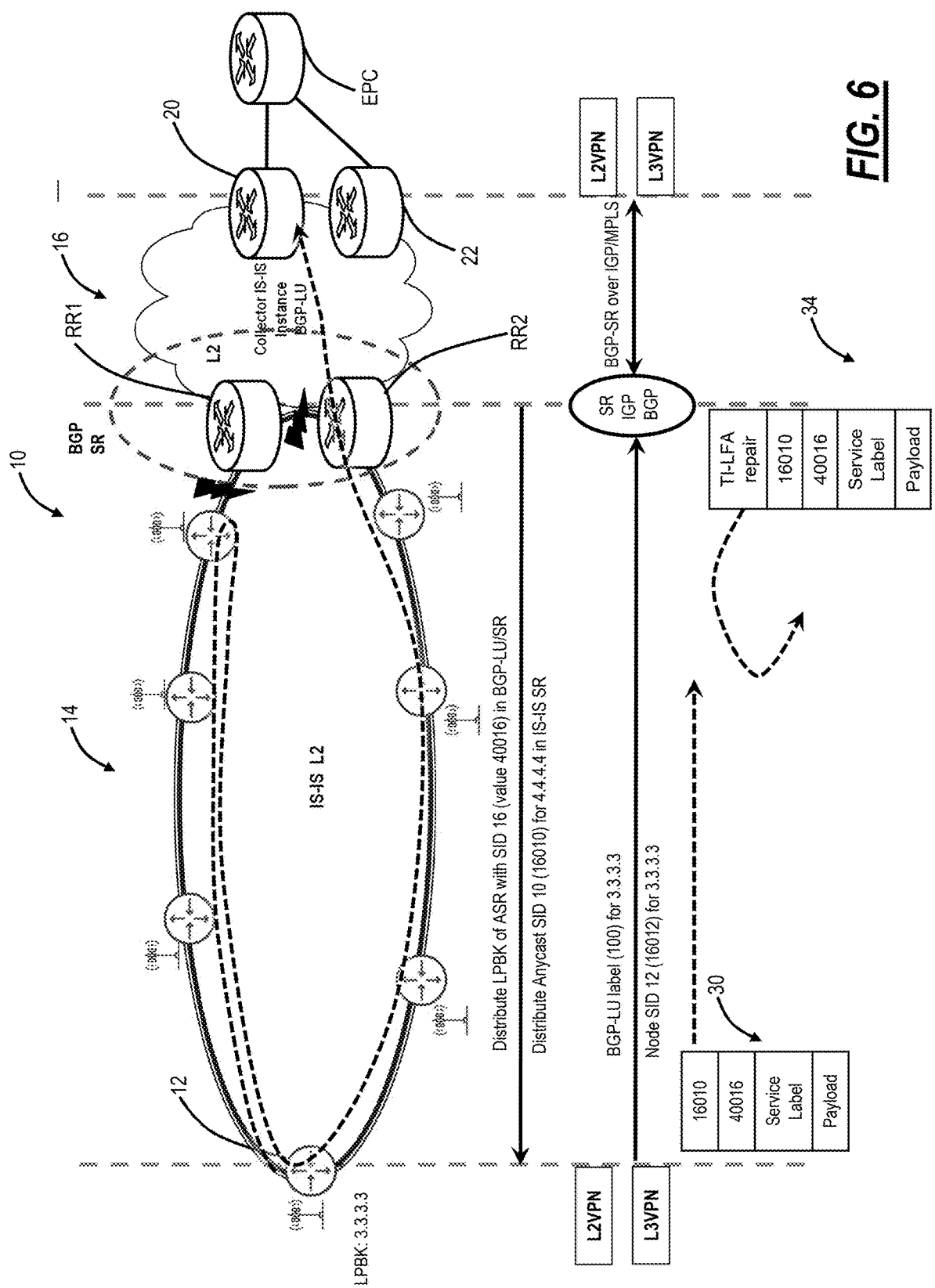
FIG. 6 is a network diagram of the network with the anycast feature illustrating data traffic flow and a SR label stack after a dual fiber cut isolating the node RR1.

FIG. 2 is a network diagram of the network 10 illustrating the anycast feature of Segment Routing for the end-to-end BGP LU tunnel resiliency. FIG. 3 is a diagram of the nodes RR1, RR2 and their corresponding addresses. FIG. 4 is a diagram of the nodes RR1, RR2, RR3 and their corresponding addresses illustrating multiple anycast groups. FIG. 5 is a network diagram of the network 10 with the anycast feature illustrating data traffic flow and a SR label stack. FIG. 6 is a network diagram of the network 10 with the anycast feature illustrating data traffic flow and a SR label stack after a dual fiber cut isolating the node RR1.

The nodes RR1, RR2 are inline route reflector and provide BGP LU routes between the nodes 12 in the access network 14 and core routers 20, 22 in the core network 16. In this example, for illustration purposes, the node 12 has a loopback address (LPBK) of 3.3.3.3, the node RR1 has a LPBK of 1.1.1.1, the node RR2 has a LPBK of 2.2.2.2.

The nodes RR1, RR2 are configured in an anycast group and configured with an anycast address (shown in the example as 4.4.4.4), as shown in FIG. 3. The anycast group (RR1 and RR2) represents subtended ring. When subtending multiple rings, each ring is represented by an anycast group. For example, if RR2 and RR3 were subtending another ring, as shown in FIG. 4, a different anycast group such as with an anycast IP address 5.5.5.5 would represent the ring. Multiple such anycast addresses can be configured based on RRs grouping.

The nodes RR1, RR2 are configured with the same BGP prefix SID for loopback between the core routers 20, 22 in the core network 16. For example, advertise core router loopback as a BGP Prefix SID (e.g., 16) exactly same by both RRs. So, if the Segment Routing Global Block (SRGB) range for BGP-SR is 40K-50K then the LU label can be 40016. The nodes RR1, RR2 already support the Next Hop Self (NHS) for BGP LU prefixes of the core routers 20, 22 in the core network 16.

At a head node 12, an inbound route policy is configured to change the Next Hop to the anycast prefix for the loopback between the core routers 20, 22 in the core network 16. Alternatively, the nodes RR1, RR2 can be configured with outbound route policy to change the Next Hop to the anycast IP address, e.g., 4.4.4.4.

This approach makes the nodes 12 use the anycast SID as the Next Hop for the core routers 20, 22 in BGP LU. If the node RR1 fails, the head node 12 may not yet come to know about this. The nearest node 12 detects the immediate neighbor failure and triggers SR protection. The anycast SID is protected via Topology-Independent Loop-Free Alternate (TI-LFA) for anycast SID and routes the traffic to the alternate node RR2. The alternate node RR2 gets the same packet and has the same BGP LU Prefix label, and it switches traffic to the core routers 20, 22. Using this approach, the RR failure impact is reduced to <50 ms.

Example

In FIG. 5, in the access network 14, the LPBK of the core routers 20, 22 is distributed BGP-LU/SR and an anycast SID is distributed in Intermediate System-Intermediate System (IS-IS) SR. For example, a SID of 16 (value of 40016) is distributed in BGP-LU/SR and an anycast SID of 10 (value of 16010) for 4.4.4.4. In the LxVPN services, there is a BGP-LU label for the node 12, 3.3.3.3, e.g., 100, and there is a node SID for the node 12, 3.3.3.3, e.g., value of 160012). In FIG. 5, traffic is flowing from the node 12, 3.3.3.3, to an EPC node in the core network 16, via the core router 20 and the node RR1 is operational. The node 12 performs a best path calculation and chooses the node RR1.

| Here, a label stack 30 for a packet from the node 12 to the EPC includes: | |
| --- | --- |
| 16010 | Anycast SID of 4.4.4.4 |
| 40016 | LPBK of the core routers 20, 22 |
| Service label | Of the LxVPN |
| Payload | Payload |

While bidirectional traffic between the node 12 and the core router 20 is shown congruent through the node RR1, in reality, it may not be. In either case, label stack shown above remains same. For example, a single fiber cut or failure isolating the node 12 from the node RR1 will cause the traffic to flow through the node RR2.

| A label stack for a packet from the nodes RR1, RR2 to the node 12 include: | |
|---|---|
| 16012 | Node SID of the node 12, 3.3.3.3 |
| 100 | BGP-LU label for the node 12, 3.3.3.3 |
| Service label | Of the LxVPN |
| Payload | Payload |

In FIG. 6, a dual fiber cut is illustrated when the node RR1 is isolated. The label stack 30 is as above for a packet from the node 12 to the EPC in the core network 16. A node 12 adjacent to the node RR1 is a Point of Local Repair (PLR) and detects the fault. When the PLR receives a packet with the label stack 30, it performs anycast SID TI-LFA which redirects traffic around the ring towards the node RR2, with a label stack 34. Since the same label stack is programmed at the node RR2, it will recognize the anycast SID as well as the BGP prefix SID and direct traffic to the core routers 20, 22 himself. In the opposite direction, from the core routers 20, 22 to the nodes RR1, RR2, convergence on reverse traffic depends on schemes applied in the core network 16.

SUMMARY

There are multiple benefits to this approach. This provides better resilience, avoids large traffic drops, and reduce traffic impact of RR failures to less than 50 ms. This approach does not require specialize data plane support or hardware capability in the router, i.e., the nodes 12, RR1, RR2. This solution improves the existing protection machinery for BGP LU protection and is scalable. Finally, this does not require change in any protocol definition and does not have inter-operability issues.

Specifically, the present disclosure handles RR isolation by an IGP PLR node using anycast SID TI-LFA. The service restoration is expected within 50 ms. MH—IP-BFD between a source node 12 and the RR will detect the failure within 300 ms (100 ms*3). With BGP-LU PIC, traffic is lost until this detection. However, with the present disclosure, traffic is already diverted, reducing the traffic loss. For comparison purposes, the following table illustrates estimates of service loss

| BGP-LU PIC | Service Loss at least 200 to 400 ms |
|---|---|
| Anycast with BGP-LU PIC | Service Loss ~50 ms |
| Anycast without BGP-LU PIC | Service Loss ~50 ms + ~5 ms |

Processes

FIG. 7 is a flowchart of a process 50, implemented at a node, in a first network, for BGP-LU resiliency using an anycast SID. The process 50 contemplates implementation via a node such as the node 12, including a switch, router, Virtual Network Function (VNF), etc. The process 50 further contemplates implementation as a method and as instructions embodied in a non-transitory computer-readable medium.

The process 50 includes adding a label stack to a packet associated with one of a Layer 2 Virtual Private Network (L2VPN) and a Layer 3 Virtual Private Network (L3VPN), wherein the packet is destined for a second network having at least a pair of Border Gateway Protocol-Label Unicast (BGP-LU) Route Reflector (RR) nodes interconnecting the first network, and wherein the label stack includes an anycast Segment Identifier (SID) for the RR nodes, in Segment Routing (step 51), and transmitting the packet towards the second network (step 52).

The label stack also includes a BGP-LU label for a destination in the second network. Responsive to isolation of one of the RR nodes, a Point of Local Repair (PLR) node in the first network is configured to implement Topology-Independent Loop-Free Alternate (TI-LFA) for the anycast SID. Also, responsive to isolation of one of the RR nodes, the packet is redirected by a Point of Local Repair (PLR) node in the first network, prior to the node determining the isolation.

The process 50 can also include changing any Next Hop BGP-LU routes for the second network received from the RR nodes to the anycast SID (step 53). The process 50 can also include receiving addresses for the second network in BGP-LU and receiving the anycast SID in Intermediate System-Intermediate System (IS-IS) SR (step 54). The label stack can also include a service label for the one of the L2VPN and L3VPN. The anycast SID is used in lieu of BGP LU Prefix Independent Convergence (PIC).

FIG. 8 is a flowchart of a process 60, implemented at BGP-LU RR node interconnecting a first network and a second network, for BGP-LU resiliency using an anycast SID. The process 60 contemplates implementation via a node such as any of the nodes RR1, RR2, RR3, including a switch, router, Virtual Network Function (VNF), etc. The process 80 further contemplates implementation as a method and as instructions embodied in a non-transitory computer-readable medium.

The process 60 includes distributing labels to one or more nodes in the first network, wherein the one or more nodes provide one of a Layer 2 Virtual Private Network (L2VPN) and a Layer 3 Virtual Private Network (L3VPN) with the second network, and wherein the labels include an anycast Segment Identifier (SID) for the BGP-LU RR node and a second BGP-LU RR node, in Segment Routing (step 61), and receiving packets for the one of the L2VPN and L3VPN and provide to the second network (step 62).

The labels also include a BGP-LU label for a destination in the second network. Responsive to isolation of the BGP-LU RR node, a Point of Local Repair (PLR) node in the first network is configured to implement Topology-Independent Loop-Free Alternate (TI-LFA) for the anycast SID. Also, responsive to isolation of the BGP-LU RR node, the packets are redirected by a Point of Local Repair (PLR) node in the first network.

The process 60 can further include distributing addresses for the second network in BGP-LU and distributing the anycast SID in Intermediate System-Intermediate System (IS-IS) SR (step 63). The anycast SID is used in lieu of BGP LU Prefix Independent Convergence (PIC).

BGP Driven Anycast Path Selection

Segment Routing (SR) technology is making in-roads in traditional MPLS-Transport Profile (MPLS-TP) Access networks. The topology of these networks is primarily Ring based. These Access networks are connected to Aggregation or Core networks, spanning across different domains, where BGP-LU is used as a tunneling mechanism for end-to-end service delivery. Generally, these deployments are without any Segment Routing—Traffic Engineering (SR-TE) policies being configured. In other words, these deployments are purely based on Segment Routing—Best Effort (SR-BE).

Figure 9:
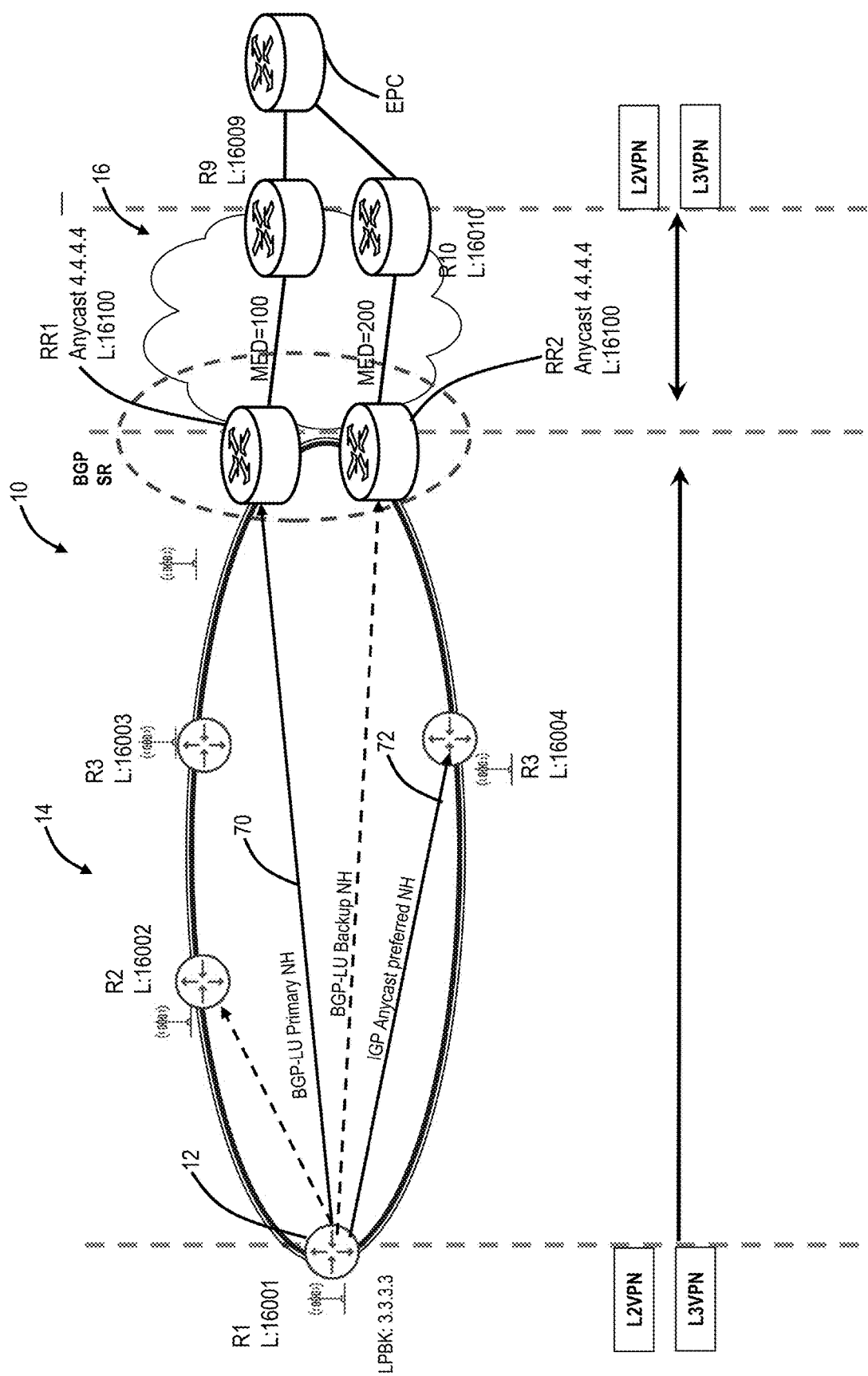
FIG. 9 is a network diagram of the network illustrating the access network and the core network with assigned SIDs.

FIG. 9 is a network diagram of the network 10 illustrating the access network 14 and the core network 16 with assigned SIDs. The numbers denoted as 'L:' signify the Label derived from Node/Prefix SID assigned. For example, the Node SID assigned to R1 Loopback IP 3.3.3.3 is 1 and so the label is 16001. The Prefix SID (Anycast) assigned to Loopback IP 4.4.4.4 on RR1 and RR2 is 100 and so the label is 16100. The SRGB advertised in both the domains is 16000-30000.

In this topology, the access network 14 is a ring-based topology including routers R1 to R4 and connected to the core network 16 via two inline RRs, RR1 and RR2. The dual RRs provide resiliency against node failures. Both the access network 14 and the core networks 16 have their independent SR underlays and utilize BGP-LU tunnels for end-to-end seamless delivery of service. The services be it L2VPN, L3VPN or EVPN are established end-to-end, i.e., between the routers R1 and R9/R10. The BGP-LU sessions are established in two segments, i.e., one between R1 and RR1/RR2 and the other between RR1/RR2 and R9/R10. RRs perform a Next-hop-self or in other words for every BGP-LU label for a Prefix advertised by R1 or R9/R10, RRs allocate a local label before advertising the Prefix to R9/R10 or R1, respectively. The introduction of BGP-SR and same SRGB across the domains makes sure that both the RRs advertise the same BGP-LU label for every BGP-LU Prefix.

For the sake of simplicity, us consider the traffic flow from R1 to R9/R10 (though same principles can apply in the reverse direction also). In such networks to reduce traffic outage due to RR node failure or isolation, traditional techniques such as BGP-LU PIC are utilized at the headend node or R1 in this case.

Another technique that is gaining traction is the use of anycast SID to reduce the traffic outage, as described herein. An anycast prefix is a prefix assigned to two or more routers in a domain (4.4.4.4 in this example). An anycast SID is a SID assigned to anycast prefix (100 in this example). The packet which originates from R1 and destined to R9 will have the Label Stack (leftmost being the Top label) as below for the Primary path (say via RR1).

[<Anycast Label> <BGP-LU Label for R9> <Service Label>] Or
[<16100> <16009> <90000>]

How the anycast label is inserted for traffic destined to R9/R10 is based on certain route policies configured at R1. The primary path referred here is the path for the topmost label or anycast prefix or the RR (RR1 or RR2). Note, this can be used with the process 50, for BGP-LU resiliency using an anycast SID.

The primary path as computed by IGP for a prefix is purely based on shortest metric or cost. The primary path as computed by BGP is based on a BGP Path Selection Algorithm which is independent of the IGP path selection criterion. The BGP Path Selection Algorithm considers many more parameters to determine the primary (or best) path.

In case the primary path selected by BGP is the same as that selected by IGP, the packet will reach the RR as intended by BGP. If BGP decides that to reach R9 it must go via the anycast prefix on RR1 and the path to Anycast Prefix as decided by IGP is via router R2, the packet will reach RR1.

In the case where the primary path selected by BGP is different than that selected by IGP, the packet will reach a different RR than the one intended by BGP. Due to labels being same on both the RRs there will be no traffic drop observed. If BGP decides that to reach R9 it must go via the anycast prefix on RR1 and the path to anycast prefix as decided by IGP is via router R4, the packet will reach RR2 instead of RR1.

The different paths selected by BGP and IGP can have some challenges in the way networks are designed and operated. As in FIG. 9, BGP selects the next hop as RR1 (denoted by solid arrow 70) based on BGP attribute Multi Exit Discriminator (MED). But IGP selected RR2 (denoted by solid arrow 72) as next hop based on shortest path. This creates problem in anycast based scenarios, where network is not honoring BGP preferred path.

In an embodiment, the present disclosure solves this problem to ensure that the traffic always follows the path intended and selected by BGP.

Figure 10:
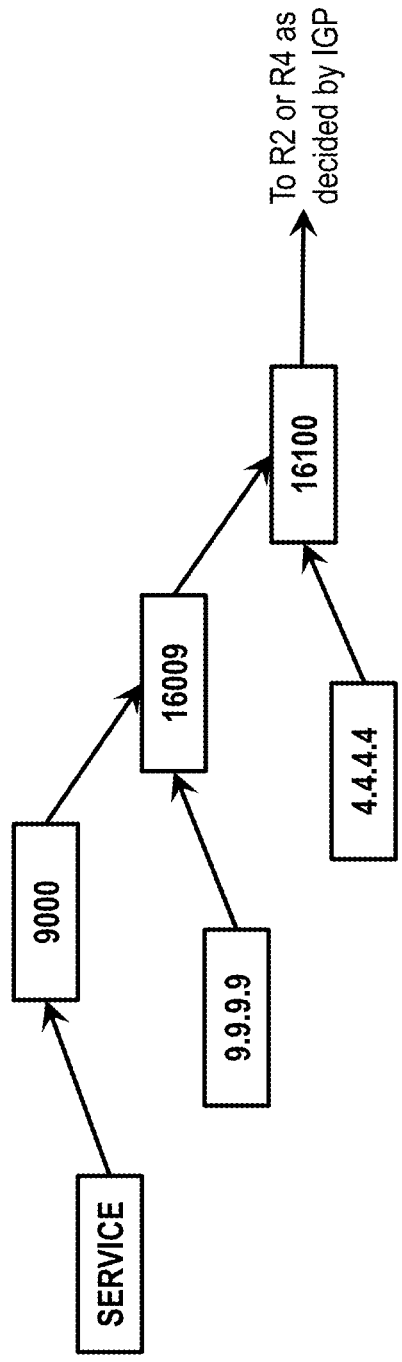
FIG. 10 is a diagram of conventional service mapping.

Currently, when BGP decides that to send packet to R9 it must go via the anycast prefix on RR1, it creates a recursive route with the outgoing label as 16009 and the next-hop as 4.4.4.4. Later any service can be mapped to this route, as illustrated in FIG. 10 which is a diagram of conventional service mapping. This does not guarantee that packet will reach the RR as decided by BGP. The packet which goes out of R1 will have the Label Stack (leftmost being the Top label) as

[<16100> <16009> <90000>]
The proposed solution is as follows:
a) BGP uses BGP Path Selection Algorithm to decide the next hop to reach R9 (say RR1).
b) BGP determines whether the next hop is an anycast prefix.
c) If the next hop is an anycast prefix, it proceeds to step (d) or else continues with the procedure as it exists today.
d) BGP determines the non-anycast loopback IP for RR1 (1.1.1.1 in this case, see FIG. 4).
e) BGP requests a Routing Information Base (RIB) to create a tunnel path with destination as anycast prefix and a condition that this path should strictly go via an upstream node directly connected to 1.1.1.1 (R3 for RR1 and R4 for RR2).
f) the RIB creates a path and provides a Path ID (say P1) to BGP. In case the path already exists due to it being already created in response to earlier request or via configuration of SR-TE policy, RIB provides the same to BGP.
g) the BGP creates a recursive route with the outgoing label as 16009 and the next-hop as P1.

Figure 11:
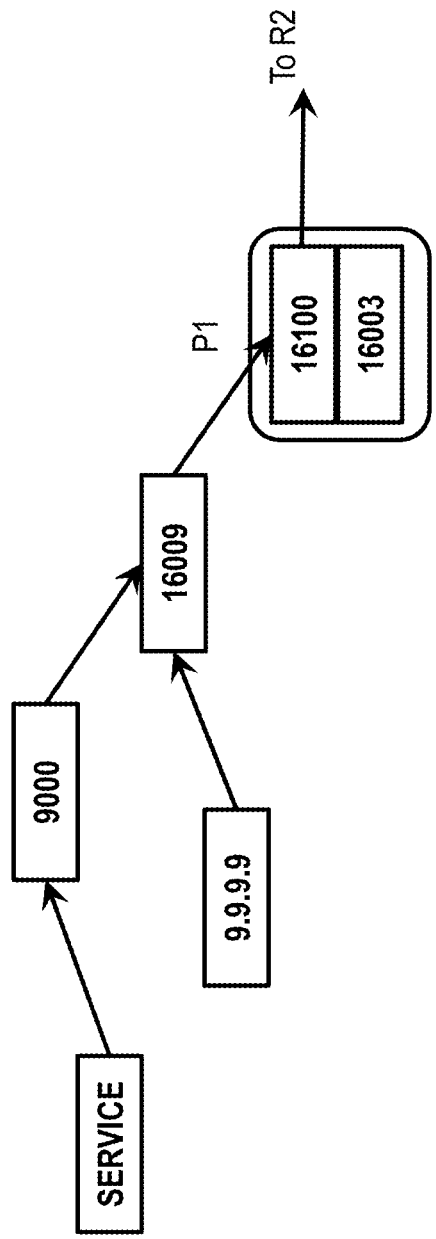
FIG. 11 is a diagram of service mapping for BGP path selection while maintaining the benefits of node resiliency provided by anycast SID.

FIG. 11 is a diagram of service mapping for BGP path selection while maintaining the benefits of node resiliency provided by anycast SID.

This ensures that the path selected is the one as decided by BGP along with the guarantee that it can still utilize the benefits of node resiliency as provided by Anycast SID.

The packet which goes out of R1 will have the Label Stack (leftmost being the Top label) as
[<16003> <16100> <16009> <90000>]

When the packet reaches R3, the label stack will be [<16100> <16009> <90000>]. In the event when RR1 node reloads, R3 will switch the traffic on the backup path for the top label, i.e., 16100 and re-direct the traffic towards RR2. Note, this can be used with the process 50, for BGP-LU resiliency using an anycast SID.

This proposal solves the anomaly created by IGP and BGP in the selection of the primary path to an anycast prefix (RR node) by the headend router (R1 in this case). The event where the traffic is switched to the backup path by the PLR node (upstream adjacent node to the anycast node or RR i.e., R3 as explained above) due to RR node failure/isolation is an existing functionality. Node resiliency is the main advantage of using Anycast SID on dual RRs and this proposal does not changes that functionality.

The proposed solution solves the problem of difference in path for an anycast prefix as selected by IGP and BGP. The solution creates an on-demand tunnel path. This path is pinned to the upstream node adjacent to the anycast node, thus ensuring that the traffic always follows the path as intended and selected by BGP. In addition, the proposed solution retains the node resiliency benefits provided by Anycast SID.

With this approach:
1) BGP determines whether the next hop as decided by the BGP Path Selection Algorithm is an Anycast Prefix or not.
2) If the next hop is an anycast prefix, BGP gets the non-anycast loopback IP (say LPBK1) for the node.
3) BGP requests RIB to create a new tunnel path with destination as Anycast Prefix and a condition that this path should strictly go via an upstream node directly connected to LPBK1.
4) RIB creates a tunnel path which satisfies the conditions provided by BGP. RIB can also provide an already existing path which satisfies all the conditions provided by BGP.
5) BGP creates a recursive route with next hop as the tunnel path provided by RIB.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A node, in a first network, comprising circuitry configured to:
   determine whether a next hop as decided by Border Gateway Protocol (BGP) utilizing a BGP Path Selection Algorithm is an anycast prefix to a Route Reflector (RR) interconnecting the first network with a second network;
   responsive to the next hop being the anycast prefix to the RR, identify a non-anycast loopback IP address of the RR associated with the determined anycast prefix, and create a tunnel defining an on-demand tunnel path with a destination based on the anycast prefix, wherein the on-demand tunnel path is pinned to an upstream node directly connected to the RR via the identified non-anycast loopback IP address; and
   utilize the tunnel for traffic having the next hop as the anycast prefix to the RR.

2. The node of claim 1, wherein the anycast prefix is assigned to two or more RRs interconnecting the first network and the second network, the RRs are configured to provide Label Switch Router (LSR) functionality.

3. The node of claim 1, wherein the BGP Path Selection Algorithm is configured to determine a primary path based on a plurality of parameters that is independent of a second path determined by Interior Gateway Protocol (IGP).

4. The node of claim 3, wherein the first path and the second path are different, and wherein the tunnel is utilized to ensure the traffic always follows the first path.

5. The node of claim 3, wherein the BGP Path Selection Algorithm utilizes a plurality of parameters where the IGP utilizes a shortest metric.

6. The node of claim 1, wherein the circuitry is further configured to responsive to the next hop not being the anycast prefix to the RR, send traffic to the next hop.

7. A method, implemented in a node in a first network, comprising steps of:
   determine whether a next hop as decided by Border Gateway Protocol (BGP) utilizing a BGP Path Selection Algorithm is an anycast prefix to a Route Reflector (RR) interconnecting the first network with a second network;
   responsive to the next hop being the anycast prefix to the RR, identify a non-anycast loopback IP address of the RR associated with the determined anycast prefix, and create a tunnel defining an on-demand tunnel path with a destination based on the anycast prefix, wherein the on-demand tunnel path is pinned to an upstream node directly connected to the RR via the identified non-anycast loopback IP address; and utilize the tunnel for traffic having the next hop as the anycast prefix to the RR.

8. The method of claim 7, wherein the anycast prefix is assigned to two or more RRs interconnecting the first network and the second network.

9. The method of claim 7, wherein a first path is decided by BGP based on a BGP Path Selection Algorithm that is independent of a second path determined by Interior Gateway Protocol (IGP).

10. The method of claim 9, wherein the first path and the second path are different, and wherein the tunnel is utilized to ensure the traffic always follows the first path.

11. The method of claim 9, wherein the BGP Path Selection Algorithm utilizes a plurality of parameters where the IGP utilizes a shortest metric.

12. The method of claim 7, wherein the steps further include responsive to the next hop not being the anycast prefix to the RR, send traffic to the next hop.

13. A non-transitory computer-readable medium comprising instructions that, when executed, cause a node in a first network to:

determine whether a next hop as decided by Border Gateway Protocol (BGP) utilizing a BGP Path Selection Algorithm is an anycast prefix to a Route Reflector (RR) interconnecting the first network with a second network;

responsive to the next hop being the anycast prefix to the RR, identify a non-anycast loopback IP address of the RR associated with the determined anycast prefix, and create a tunnel defining an on-demand tunnel path with a destination based on the any cast prefix, wherein the on-demand tunnel path is pinned to an upstream node directly connected to the RR via the identified non-anycast loopback IP address; and utilize the tunnel for traffic having the next hop as the anycast prefix to the RR.

14. The non-transitory computer-readable medium of claim 13, wherein the anycast prefix is assigned to two or more RRs interconnecting the first network and the second network.

15. The non-transitory computer-readable medium of claim 13, wherein a first path is decided by BGP based on a BGP Path Selection Algorithm that is independent of a second path determined by Interior Gateway Protocol (IGP).

16. The non-transitory computer-readable medium of claim 15, wherein the first path and the second path are different, and wherein the tunnel is utilized to ensure the traffic always follows the first path.

17. The non-transitory computer-readable medium of claim 15, wherein the BGP Path Selection Algorithm utilizes a plurality of parameters where the IGP utilizes a shortest metric.

\* \* \* \* \*